United States Patent
Xu et al.

(10) Patent No.: US 12,402,077 B2
(45) Date of Patent: Aug. 26, 2025

(54) MANAGING CONTROL CHANNEL MONITORING

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 17/754,821

(22) PCT Filed: Nov. 20, 2019

(86) PCT No.: PCT/CN2019/119590
§ 371 (c)(1),
(2) Date: Apr. 13, 2022

(87) PCT Pub. No.: WO2021/097692
PCT Pub. Date: May 27, 2021

(65) Prior Publication Data
US 2024/0107455 A1  Mar. 28, 2024

(51) Int. Cl.
*H04W 52/02* (2009.01)
(52) U.S. Cl.
CPC ............. *H04W 52/0235* (2013.01); *H04W 52/0216* (2013.01)
(58) Field of Classification Search
None
See application file for complete search history.

(56) References Cited

U.S. PATENT DOCUMENTS

| | | | |
|---|---|---|---|
| 10,027,460 B2* | 7/2018 | McBeath | .............. H04L 5/0091 |
| 11,751,140 B2* | 9/2023 | Li | ..................... H04W 52/0216 370/318 |

(Continued)

FOREIGN PATENT DOCUMENTS

| WO | 2019122518 A1 | 6/2019 |
|---|---|---|
| WO | 2019157766 A1 | 8/2019 |
| WO | 2019193238 A1 | 10/2019 |
| WO | 2019194531 A1 | 10/2019 |

OTHER PUBLICATIONS

Vivo "R1-1912049: Remaining aspects of PDCCH-based power saving signal" 3GPP TSG RAN WG1 #99, Nov. 18-22, 2019; Reno, USA; 11 pages.

(Continued)

*Primary Examiner* — Michael J Moore, Jr.
*Assistant Examiner* — Gautam Sharma
(74) *Attorney, Agent, or Firm* — Arun Swain

(57) ABSTRACT

This disclosure provides systems and methods, including computer programs encoded on computer storage media, for managing control channel monitoring. In an aspect, a mobile device may receive a wakeup signal including an indication of one or more groups of physical downlink control channel (PDCCH) search space sets. The mobile device may determine one or more PDCCH monitoring times based on the indication of the one or more groups of PDCCH search space sets. The mobile device may monitor the PDCCH during the determined one or more PDCCH monitoring times. In another aspect, a network element may configure two or more groups of physical downlink control channel (PDCCH) search space sets among the plurality of mobile devices and transmit a wakeup signal indicating to the plurality of mobile devices which of the two groups of PDCCH search space sets to which each mobile device of the plurality of mobile devices belongs.

32 Claims, 12 Drawing Sheets

(56) References Cited

U.S. PATENT DOCUMENTS

| | | | |
|---|---|---|---|
| 2018/0270756 A1 | 9/2018 | Bhattad et al. | |
| 2018/0332533 A1* | 11/2018 | Bhattad | H04W 52/0235 |
| 2018/0332549 A1 | 11/2018 | Bhattad et al. | |
| 2019/0150094 A1 | 5/2019 | Liu et al. | |
| 2019/0261326 A1 | 8/2019 | Xu et al. | |
| 2020/0092814 A1* | 3/2020 | Zhou | H04W 52/0235 |
| 2021/0204214 A1* | 7/2021 | Chang | H04W 72/1263 |
| 2021/0329555 A1* | 10/2021 | Jiang | H04W 68/005 |
| 2021/0360532 A1* | 11/2021 | Jiang | H04W 52/0235 |
| 2022/0116875 A1* | 4/2022 | Nimbalker | H04W 52/0216 |
| 2022/0182943 A1* | 6/2022 | Maleki | H04W 52/0241 |
| 2024/0107455 A1* | 3/2024 | Xu | H04W 52/0216 |

OTHER PUBLICATIONS

International Searching Authority; International Search Report and Written Opinion; International Application No. PCT/CN2019/119590; mailed Jul. 29, 2020; 7 pages.

Catt: "Offline Discussion Summary of PDCCH-based Power Saving Signal/Channel", 3GPP TSG RAN WG1 Meeting #98, R1-1909799, Prague, CZ, Aug. 26-30, 2019, 29 Pages.

Supplementary European Search Report—EP19953500—Search Authority—The Hague—Jul. 19, 2023. 8 pages.

Vivo: "PDCCH-based power saving signal/channel design", 3GPP TSG RAN WG1 #96bis, R1-1904103, 3rd Generation Partnership Project, Mobile Competence Centre, 650, Route Des Lucioles, F-06921, Sophia-Antipolis Cedex, France, Apr. 2, 2019, 7 Pages, XP051707113, paragraph [0002].

\* cited by examiner

MANAGING CONTROL CHANNEL MONITORING

TECHNICAL FIELD

This disclosure relates generally to mobile devices, and more particularly to managing control channel monitoring by mobile devices.

DESCRIPTION OF RELATED TECHNOLOGY

Mobile devices may obtain control signaling, such as downlink control information (DCI) from a base station to enable the reception and transmission of downlink and uplink data. Control signaling is typically provided via a Physical Downlink Control Channel (PDCCH) and includes information about downlink shared channel resource allocation and transport format, among other things. However, performing blind detection of information in the PDCCH may involve scanning a large number of search candidates, which is costly to mobile devices in terms of computation, latency, and power consumption.

SUMMARY

The systems, methods and devices of this disclosure each have several innovative aspects, no single one of which is solely responsible for the desirable attributes disclosed herein.

One innovative aspect of the subject matter described in this disclosure may be implemented in a mobile device. Some implementations may include methods performed by a processor of the mobile device for managing control channel monitoring. Some aspects may include receiving a wakeup signal comprising an indication of one or more groups of physical downlink control channel (PDCCH) search space sets, determining one or more PDCCH monitoring times based on the indication of the one or more groups of PDCCH search space sets, and monitoring the PDCCH during the determined one or more PDCCH monitoring times.

In some aspects, receiving the wakeup signal comprising the indication of one or more groups of PDCCH search space sets may include determining a value of a bit in the wakeup signal, and determining the one or more groups of PDCCH search space sets based on the determined value of the bit in the wakeup signal. In some aspects, one of the one or more groups of PDCCH search space sets may be associated with mini-slot level monitoring. In some aspects, one of the one or more groups of PDCCH search space sets may be associated with slot level monitoring. In some aspects, one of the one or more groups of PDCCH search space sets may be associated with a combination of mini-slot level monitoring and slot level monitoring.

In some aspects, receiving the wakeup signal including the indication of one or more groups of PDCCH search space sets may include determining two groups of PDCCH search space sets between which the mobile device may switch to monitor the PDCCH. In some aspects, the one or more groups of PDCCH search space sets may indicate frequencies in a New Radio Unlicensed (NR-U) spectrum. In some aspects, monitoring the PDCCH during the determined one or more PDCCH monitoring times may include waking up from a low power state to monitor the PDCCH during the determined one or more PDCCH monitoring times.

One innovative aspect of the subject matter described in this disclosure may be implemented in a network element. Some implementations may include methods performed by a processor of the network element for managing control channel monitoring. Some aspects may include configuring two or more groups of physical downlink control channel (PDCCH) search space sets among the plurality of mobile devices, and transmitting a wakeup signal (WUS) to indicate to the plurality of mobile devices which of the two groups of PDCCH search space sets to which each mobile device of the plurality of mobile devices belongs.

In some aspects, the WUS may be in a DCI format transmitted over the PDCCH. In some aspects, one of the one or more groups of PDCCH search space sets may be associated with mini-slot level monitoring. In some implementations, one of the one or more groups of PDCCH search space sets may be associated with slot level monitoring. In some aspects, one of the one or more groups of PDCCH search space sets may be associated with a combination of mini-slot level monitoring and slot level monitoring. In some aspects, the network element may be a gNodeB.

Further aspects may include a wireless device having a processor configured with processor-executable instructions to perform operations of any of the methods summarized above. Further aspects may include a non-transitory processor-readable storage medium having stored thereon processor-executable instructions configured to cause a processor of a wireless device to perform operations of the methods summarized above. Further aspects include a wireless device having means for performing functions of the methods summarized above. Further aspects include a system on chip for use in a wireless device that includes a processor configured to perform one or more operations of the methods summarized above. Further aspects include a system in a package that includes two systems on chip for use in a wireless device that includes a processor configured to perform one or more operations of the methods summarized above.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
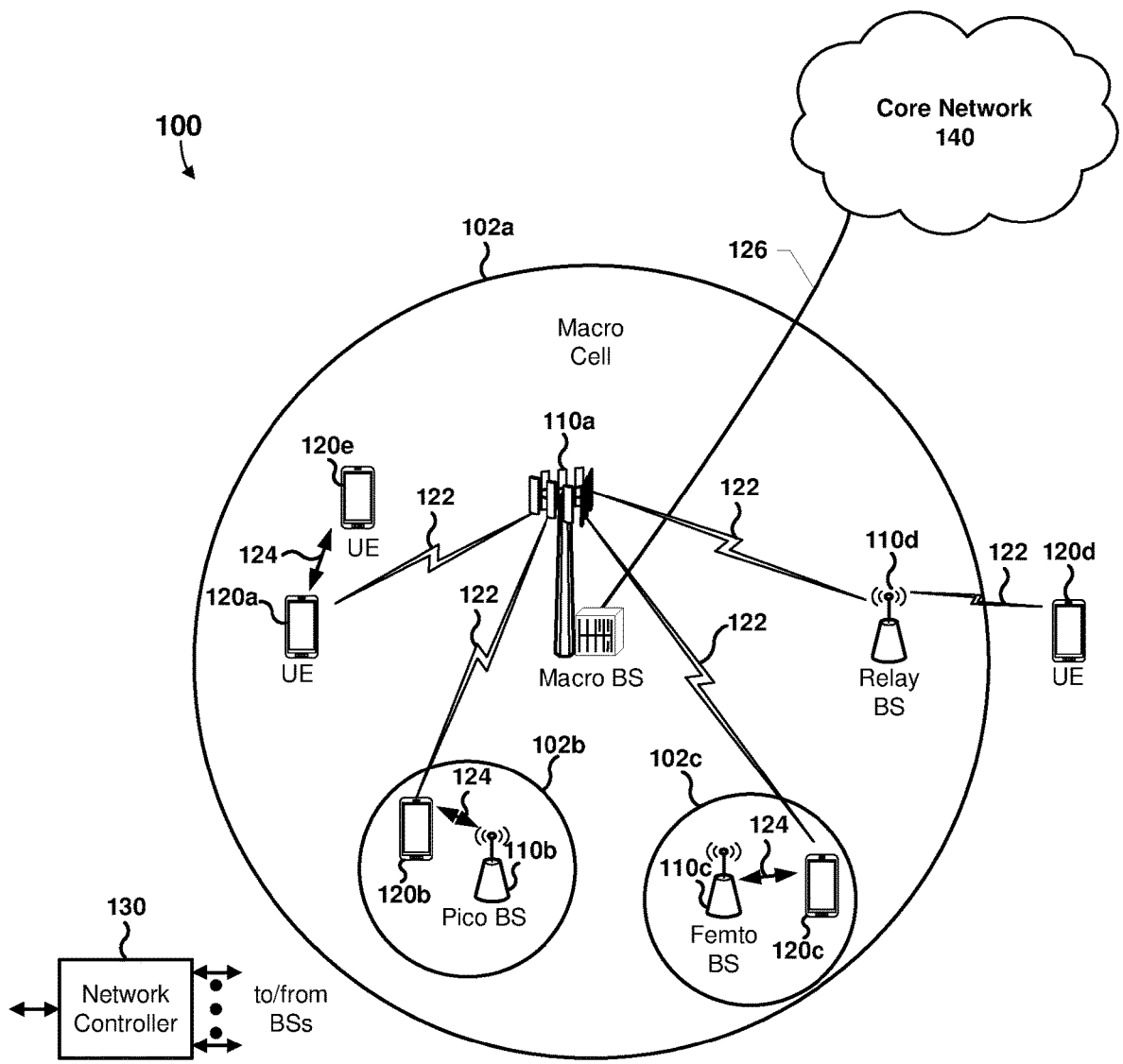
FIG. 1 shows a system block diagram illustrating an example communications system.

The following description is directed to certain implementations for the purposes of describing the innovative aspects of this disclosure. However, a person having ordinary skill in the art will readily recognize that the teachings herein may be applied in a multitude of different ways.

The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other signals that are used to communicate within a wireless, cellular or Internet of Things (IoT) network, such as a system utilizing 3G, 4G, or 5G technology, or further implementations thereof.

Mobile devices typically obtain control signaling (such as downlink control information (DCI)) from a Physical Downlink Control Channel (PDCCH) transmitted from a base station (such as a gNodeB). The control signaling enables the mobile devices to receive downlink (DL) data and transmit uplink (UL) data. Performing blind detection of information in the PDCCH wastes power and computational resources, and may cause performance latency. Performing blind detection may include, for example, attempting to locate PDCCH data (such as the DCI) by decoding a set of possible PDCCH (or DCI) candidates or locations.

In various implementations, mobile devices may be provided with two (or more) groups of PDCCH search space sets for the PDCCH. Search spaces may specify a set of candidate control channels (such as formed by control channel elements of a Control Resource Set, or CORESET) in order to restrict blind searching by the mobile device. A given search space set may be included in more than one group. A mobile device may be configured to switch between groups. In some implementations, the mobile device may switch groups based on detecting one or more of a downlink burst, a demodulation reference signal (DMRS) or wideband DMRS (WB-DMRS), the PDCCH, a Group Common PDCCH (GC-PDCCH), or based on information in a Channel Occupancy Time (COT) structure. In some implementations, the mobile device may switch groups based on information or an instruction in the PDCCH or GC-PDCCH. In some implementations, the mobile device may switch groups based on information in the DCI.

A mobile device may monitor the PDCCH in one or more time intervals. For example, the mobile device may monitor the PDCCH in one or more slots, or one or more mini-slots. In some implementations, the mobile device may perform mini-slot monitoring outside of the COT and may perform slot monitoring inside the COT, which may enable a base station to transmit signals at a finer resolution.

Some implementations enable a mobile device to efficiently monitor a PDCCH during short designated times to conserve power. In some implementations, a mobile device may receive a wakeup signal from a base station (such as a gNodeB). In some implementations, the base station may configure two or more groups of PDCCH search space sets among a plurality of mobile devices, and may transmit a wakeup signal (WUS) to indicate to the plurality of mobile devices which of the two groups of PDCCH search space sets to which each mobile device of the plurality of mobile devices belongs. In some implementations, the base station may transmit the wakeup signal in a DCI format (for example, a 5G NR DCI format type, or included in or as a part of the DCI). The wakeup signal may include an indication of one or more groups of PDCCH search space sets. The wakeup signal may be transmitted during a pre-wakeup window during which the mobile device does not monitor the PDCCH, to reduce mobile device power consumption for monitoring the wakeup signal. In some implementations, the mobile device may determine a value of a bit in the wakeup signal, and may determine one or more groups of PDCCH search space sets based on the determined value of the bit in the wakeup signal. In some implementations, one or more groups of PDCCH search space sets may be associated with mini-slot level monitoring, with slot level monitoring, or with a combination of mini-slot level monitoring and slot level monitoring. In some implementations, the mobile device may determine one or more PDCCH monitoring times based on the indication of the one or more groups of PDCCH search space sets. The mobile device may monitor the PDCCH during the determined one or more PDCCH monitoring times.

Particular implementations of the subject matter described in this disclosure can be implemented to realize one or more of the following potential advantages. Implementations improve the operations of a mobile device and a communication network by reducing an amount of computing resources or an amount of latency caused by monitoring the PDCCH. Further, implementations improve the operations of a mobile device and a communication network by reducing a power consumption of the mobile device's power storage caused by monitoring the PDCCH.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (such as a CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

FIG. 1 shows a system block diagram illustrating an example communications system. The communications system 100 may be an 5G NR network, or any other suitable network such as an LTE network.

The communications system 100 may include a heterogeneous network architecture that includes a core network 140 and a variety of mobile devices (illustrated as wireless device 120a-120e in FIG. 1). The communications system 100 also may include a number of base stations (illustrated as the BS 110a, the BS 110b, the BS 110c, and the BS 110d) and other network entities. A base station is an entity that communicates with wireless devices (mobile devices), and also may be referred to as an Computing platformB, a Computing platform B, an LTE evolved computing platformB (eNB), an access point (AP), a radio head, a transmit receive point (TRP), a New Radio base station (NR BS), a 5G Computing platformB (NB), a Next Generation Computing platformB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "computing platform B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network computing platforms (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a mobile device) and send a transmission of the data to a downstream station (for example, a wireless device or a base station). A relay station also may be a mobile device that can relay transmissions for other wireless devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported.

Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices (for example, illustrated as the wireless device 120a and the wireless device 120e) may communicate directly using one or more sidelink channels (for example, without using a base station 110a-d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the base station 110a-110d.

Figure 2:
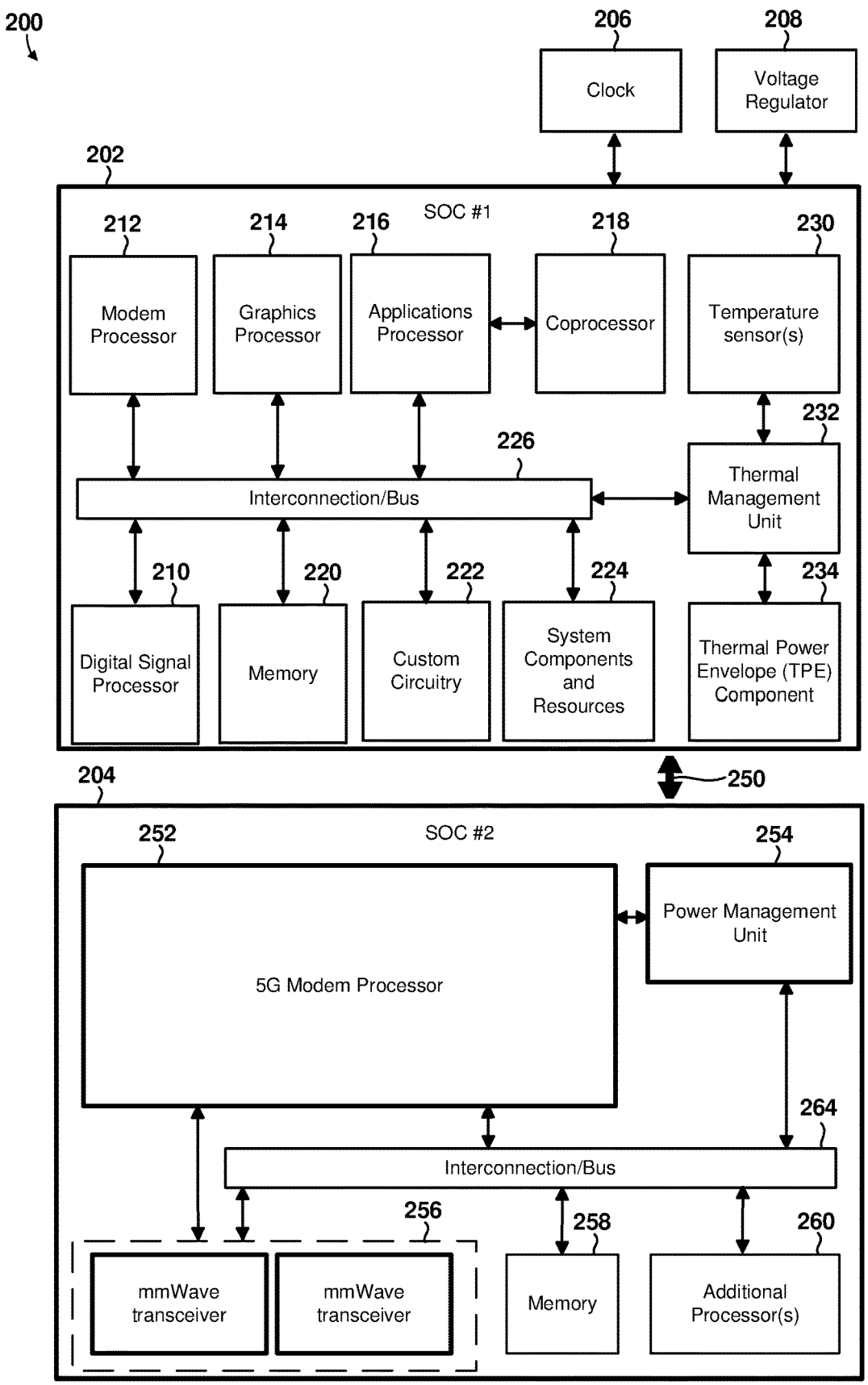
FIG. 2 shows a component block diagram illustrating an example computing system that may be configured to implement management of cell selection.

FIG. 2 shows a component block diagram illustrating an example computing system that may be configured to implement management of cell selection. Some implementations may be implemented on a number of single processor and multiprocessor computer systems, including a system-on-chip (SOC) or system in a package (SIP). The example illustrated in FIG. 2 is a SIP 200 architecture that may be used in wireless devices implementing some implementations.

With reference to FIGS. 1 and 2, the illustrated example SIP 200 includes a two SOCs 202, 204, a clock 206, and a voltage regulator 208. In some implementations, the first SOC 202 operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
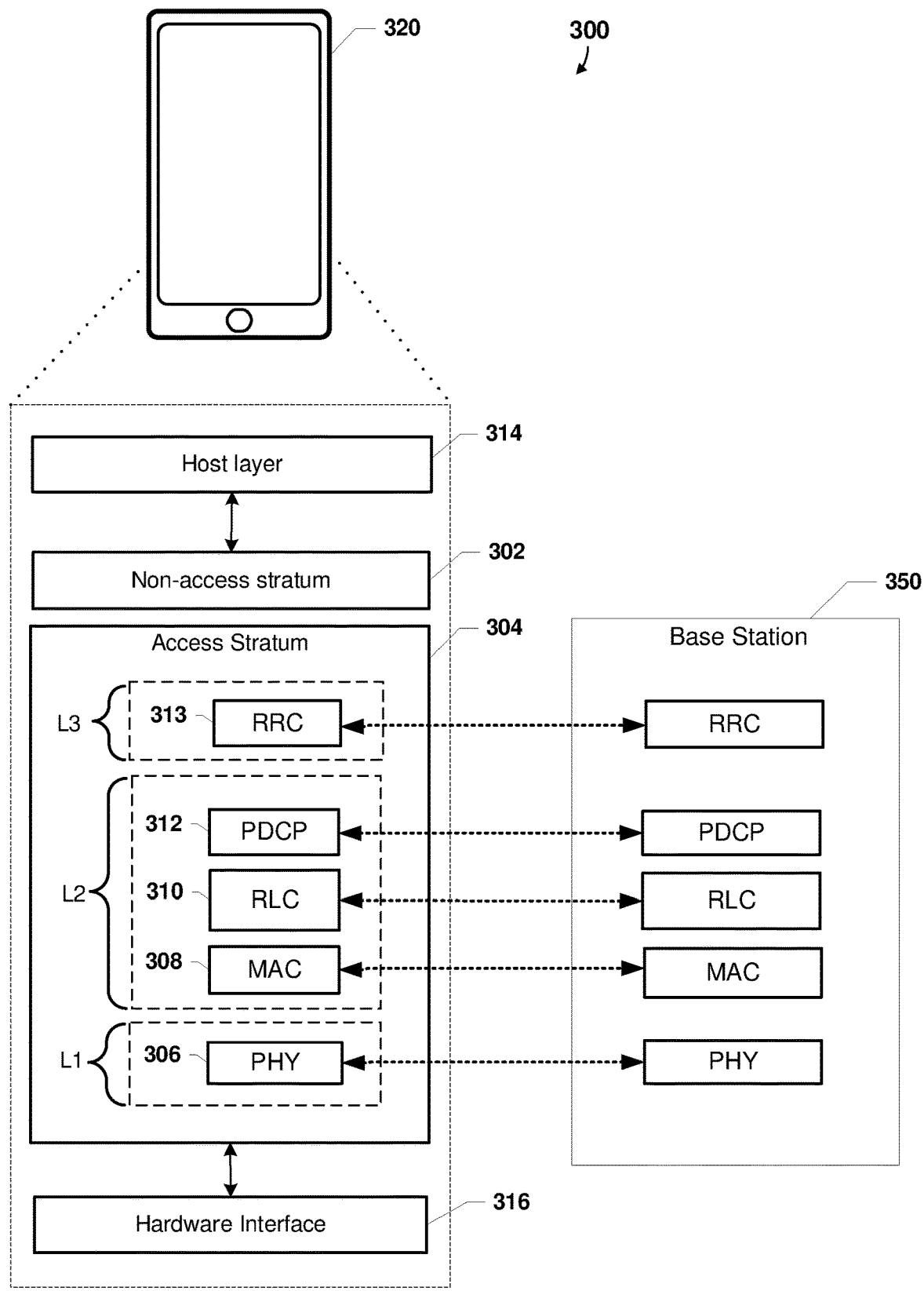
FIG. 3 shows a component block diagram of an example software architecture including a radio protocol stack for the user and control planes in wireless communications.

FIG. 3 shows a component block diagram of an example of a software architecture 300 including a radio protocol stack for the user and control planes in wireless communications. The software architecture 300 including a radio protocol stack for the user and control planes in wireless communications between a base station 350 (such as the base station 110a) and a wireless device 320 (such as the wireless device 120a-120e, 200). With reference to FIGS. 1-3, the wireless device 320 may implement the software architecture 300 to communicate with the base station 350 of a communication system (such as 100). In some implementations, layers in software architecture 300 may form logical connections with corresponding layers in software of the base station 350. The software architecture 300 may be distributed among one or more processors (such as the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (such as two protocol stacks associated with two SIMs, respectively, in a dual-SIM wireless communication device). While described below with reference to LTE communication layers, the software architecture 300 may support any of variety of standards and protocols for wireless communications, or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In some implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions INCLUDING broadcasting system information, paging, and establishing and releasing an RRC signaling connection between the wireless device 320 and the base station 350.

In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as IP layer) in which a logical connection terminates at a packet data network (PDN) gateway (PGW).

In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4A:
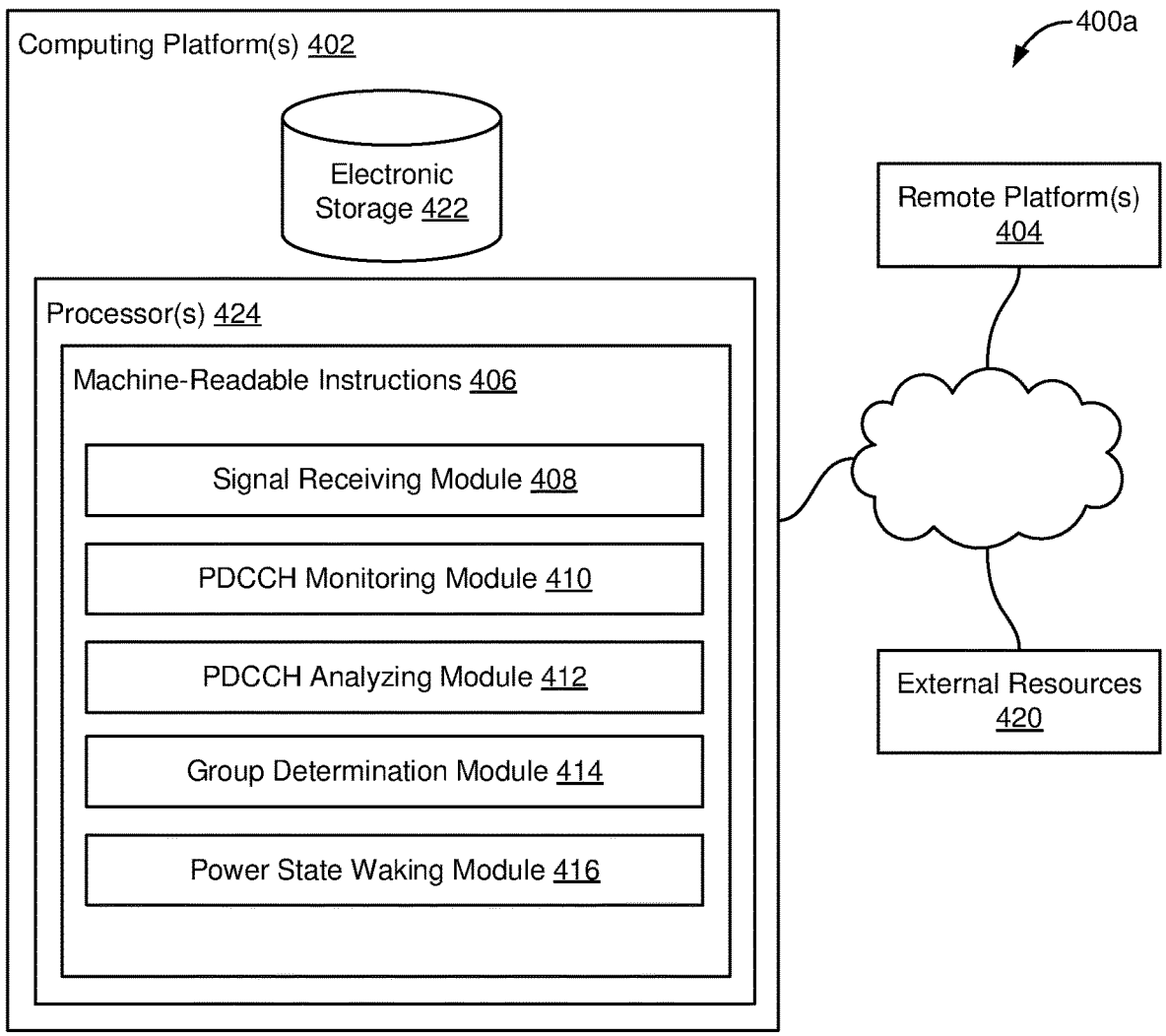
FIG. 4A shows a component block diagram illustrating an example system configured for managing control channel monitoring.

FIG. 4A is a component block diagram illustrating a system 400A configured for managing control channel monitoring performed by a processor of a mobile device in accordance with some implementations. In some implementations, system 400a may include one or more computing platforms 402 or one or more remote platforms 404. With reference to FIGS. 1-4A, computing platform(s) 402 may include a wireless device (for example, the wireless device 120a-120e, 200, 320). Remote platform(s) 404 may include a base station (for example, the base station 110a-110d, 350) or a wireless device (for example, the wireless device 120a-120e, 200, 320).

Computing platform(s) 402 may be configured by machine-readable instructions 406. Machine-readable instructions 406 may include one or more instruction modules that may execute on one or more processor 424. The instruction modules may include computer program modules. The instruction modules may include one or more of a signal receiving module 408, a PDCCH monitoring module 410, a PDCCH analyzing module 412, a group determination module 414, a power state waking module 416, or other instruction modules.

The signal receiving module 408 may be configured to receive a wakeup signal including an indication of one or more groups of physical downlink control channel search space sets. In some implementations, one of the one or more groups of PDCCH search space sets may be associated with mini-slot level monitoring. In some implementations, one of the one or more groups of PDCCH search space sets may be associated with slot level monitoring. In some implementations, one of the one or more groups of PDCCH search space sets may be associated with a combination of mini-slot level monitoring and slot level monitoring. In some implementations, the one or more groups of PDCCH search space sets may indicate frequencies in a New Radio Unlicensed spectrum.

The PDCCH monitoring module 410 may be configured to monitor the PDCCH during the determined one or more PDCCH monitoring times. In some implementations, the PDCCH monitoring module 410 may be configured to determine one or more PDCCH monitoring times based on the indication of the one or more groups of PDCCH search space sets.

The PDCCH analyzing module 412 may be configured to determine a value of a bit in the wakeup signal. The PDCCH analyzing module 412 may be further configured to determine the one or more groups of PDCCH search space sets based on the determined value of the bit in the wakeup signal.

The group determination module 414 may be configured to determine two groups of PDCCH search space sets between which the mobile device may switch to monitor the PDCCH.

The power state waking module 416 may be configured to wake up from a low power state to monitor the PDCCH during the determined one or more PDCCH monitoring times.

Figure 4B:
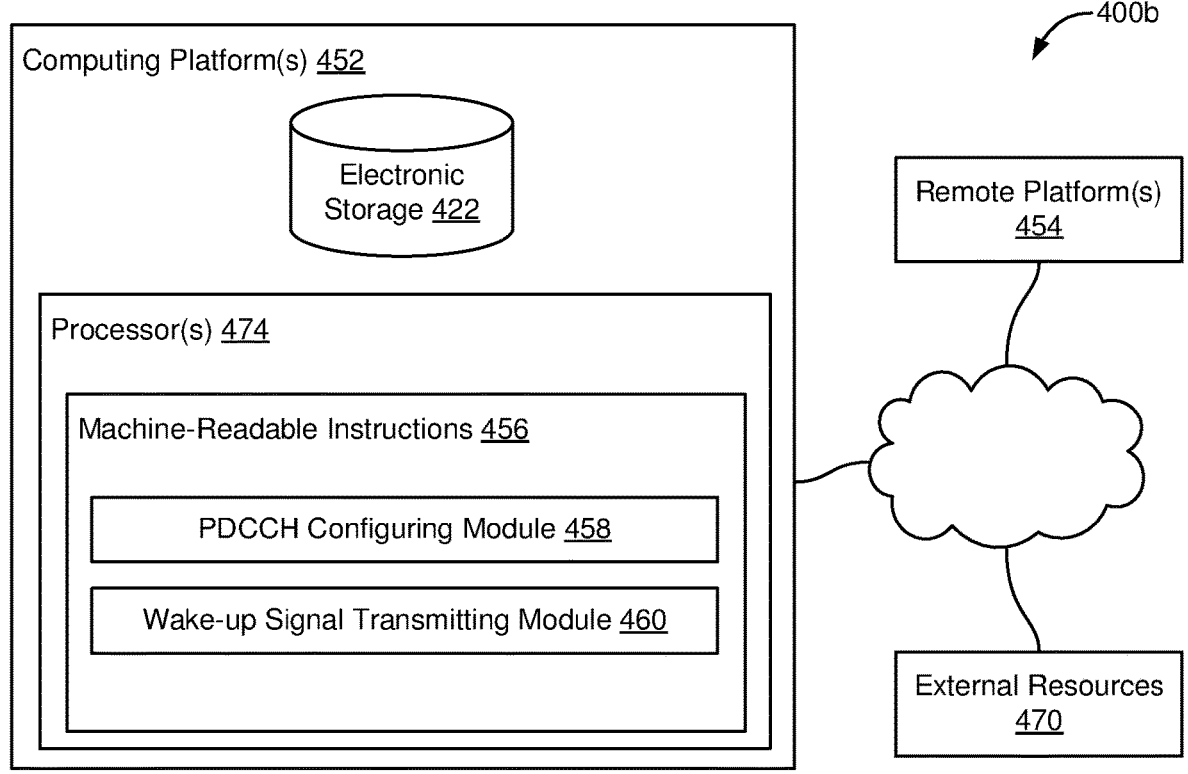
FIG. 4B shows a component block diagram illustrating an example system configured for managing control channel monitoring.

FIG. 4B is a component block diagram illustrating a system 400b configured for managing control channel monitoring performed by a processor of a mobile device in accordance with some implementations. In some implementations, system 400b may include one or more computing platforms 452 or one or more remote platforms 454. With reference to FIGS. 1-4B, computing platform(s) 452 may include a base station (for example, the base station 110a-110d, 350). Remote platform(s) 454 may include a base station (for example, the base station 110a-110d, 350) or a wireless device (for example, the wireless device 120a-120e, 200, 320).

Computing platform(s) 452 may be configured by machine-readable instructions 456 that may execute on one or more processor 474. Machine-readable instructions 456 may include one or more instruction modules. The instruction modules may include computer program modules. The instruction modules may include one or more of a PDCCH configuring module 458, a wakeup signal transmitting module 460, or other instruction modules.

The PDCCH configuring module 458 may be configured to configure two or more groups of PDCCH search space sets among the plurality of mobile devices.

The wakeup signal transmitting module 460 make be configured to transmit a wakeup signal to indicate to the plurality of mobile devices which of the two groups of PDCCH search space sets to which each mobile device of the plurality of mobile devices belongs. In some implementations, the wakeup signal may be indicated by a bit in the PDCCH. In some implementations, one of the one or more groups of PDCCH search space sets may be associated with mini-slot level monitoring. In some implementations, one of the one or more groups of PDCCH search space sets may be associated with slot level monitoring. In some implementations, one of the one or more groups of PDCCH search space sets may be associated with a combination of mini-slot level monitoring and slot level monitoring.

Figure 5A:
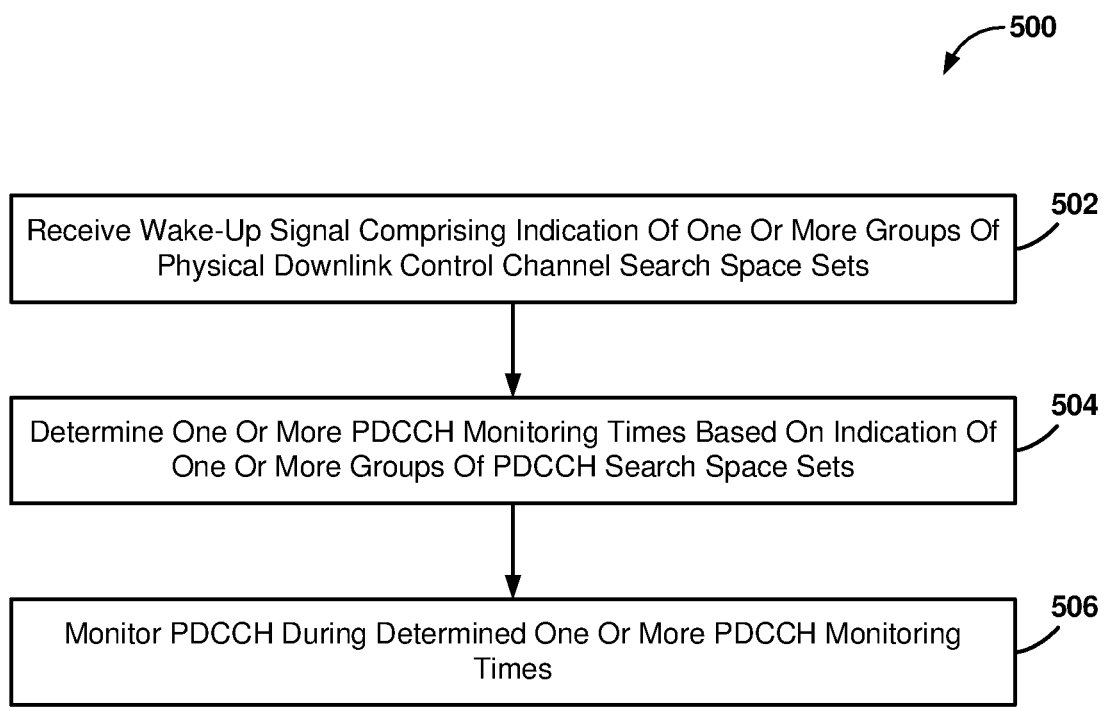
FIG. 5A shows a process flow diagram of an example method performed by a processor of a mobile device for managing control channel monitoring.
Figure 5B:
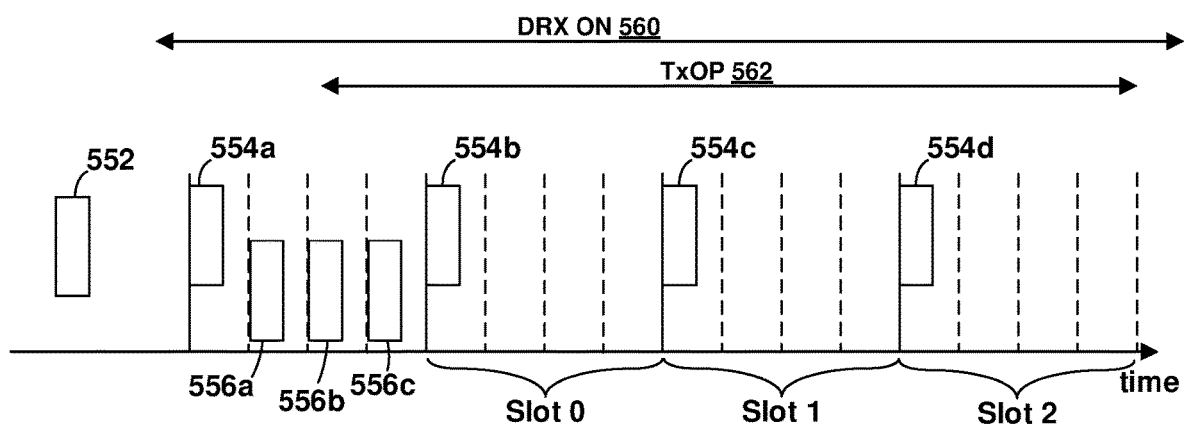
FIG. 5B shows a block diagram of an example method performed by a processor of a mobile device for managing control channel monitoring.

FIG. 5A shows a process flow diagram of an example method 500 performed by a processor of a mobile device for managing control channel monitoring, and FIG. 5B shows a signal time diagram illustrating monitoring opportunities for control channel monitoring. FIGS. 5A and 5B are described in relation to one another. With reference to FIGS. 1-5B the operations of the method 500 may be performed by a processor of a mobile device (such as the wireless device 120a-120e, 200, 320).

In block 502, the processor may receive a wakeup signal including an indication of one or more groups of PDCCH space sets. For example, the processor may receive a wakeup signal 552 (FIG. 5B). In some implementations, the wakeup signal may be transmitted during a pre-wakeup window during which the mobile device does not monitor the PDCCH. In some implementations, the wakeup signal may include an indication of one or more groups of PDCCH search space sets. In some implementations, the one or more groups of PDCCH search space sets indicate frequencies in a New Radio Unlicensed (NR-U) spectrum.

In block 504, the processor may determine one or more PDCCH monitoring times based on the indication of the one or more groups of PDCCH search space sets. In some implementations, one or more groups of PDCCH search space sets may be associated with mini-slot level monitoring. For example, a search space set may be associated with mini-slot monitoring occasions 556a, 556b, and 556c. In some implementations, the mini-slot monitoring occasions may occur outside or at the beginning of a channel occupancy time (COT).

In some implementations, one or more groups of PDCCH search space sets may be associated with slot level monitoring. For example, a search space set may be associated with slot monitoring occasions 554a, 554b, 554c, and 554d. In some implementations, the slot monitoring occasions may occur inside the COT.

In some implementations, one or more groups of PDCCH search space sets may be associated with a combination of mini-slot level monitoring and slot level monitoring. For example, a search space set may be associated with a combination of mini-slot monitoring occasions 556a, 556b, and 556c, and slot monitoring occasions 554a, 554b, 554c, and 554d. In some implementations, the processor may perform dynamic switching between mini-slot monitoring occasions and slot monitoring occasions during the discontinuous reception (DRX) ON period 560. In some implementations, the processor may perform dynamic switching between mini-slot monitoring occasions and slot monitoring occasions during the transmission opportunity (TxOP) period 562. In some implementations, the wakeup signal may indicate only one PDCCH group, in which case the processor will not perform dynamic switching.

In block 506, the processor may monitor the PDCCH during the determined one or more PDCCH monitoring times. In some implementations, the mobile device may wakeup from a low power state to monitor the PDCCH during the determined one or more PDCCH monitoring times (for example, the mini-slot monitoring occasions 556a, 556b, and 556c or the slot monitoring occasions 554a, 554b, 554c, and 554d).

Figure 6A:
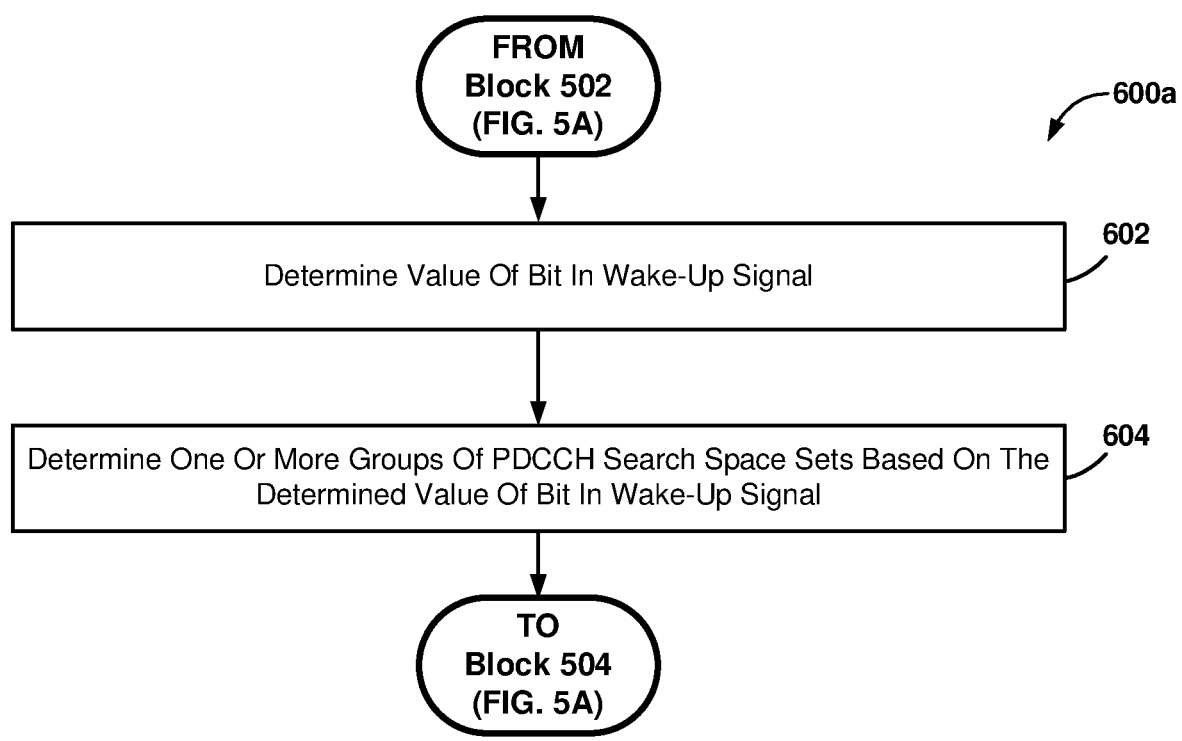
FIGS. 6A-6C show process flow diagrams of example operations that may be performed as part of the method for managing control channel monitoring.

FIG. 6A shows a process flow diagram of example operations that may be performed as part of the method 600a for managing control channel monitoring. With reference to FIGS. 1-6A the operations of the method 600a may be performed by a processor of a mobile device (such as the wireless device 120a-120e, 200, 320).

In some implementations following the operations of block 502 (FIG. 5A), the processor may determine a value of a bit in the wakeup signal in block 602.

In block 604, the processor may determine the one or more groups of PDCCH search space sets based on the determined value of the bit in the wakeup signal. For example, the bit may indicate one or more groups of PDCCH search space sets that are associated with mini-slot level monitoring. As another example, the bit may indicate one or more groups of PDCCH search space sets that are associated with slot level monitoring. As another example, the bit may indicate one or more groups of PDCCH search space sets that are associated with a combination of mini-slot level monitoring and slot level monitoring.

The processor may proceed to perform the operations of block 504 (FIG. 5A).

Figure 6B:
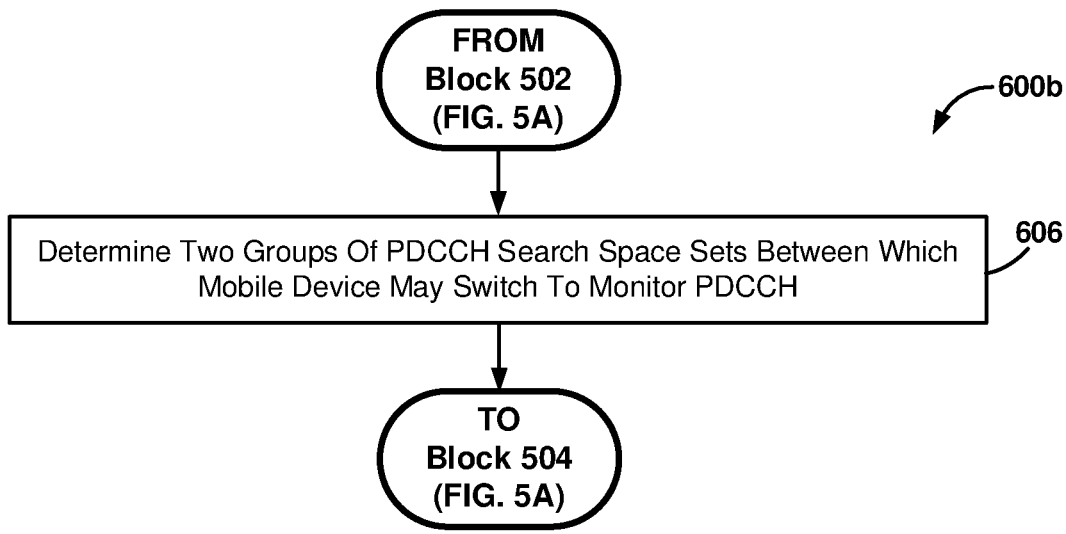

FIG. 6B shows a process flow diagram of example operations that may be performed as part of the method 600b for managing control channel monitoring. With reference to FIGS. 1-6B the operations of the method 600b may be performed by a processor of a mobile device (such as the wireless device 120a-120e, 200, 320).

In some implementations following the operations of block 502 (FIG. 5A), the processor may determine two groups of PDCCH search space sets between which the mobile device may switch to monitor the PDCCH. For example, in some implementations, the processor may perform dynamic switching between mini-slot monitoring occasions and slot monitoring occasions in block 606.

The processor may proceed to perform the operations of block 504 (FIG. 5A).

Figure 6C:
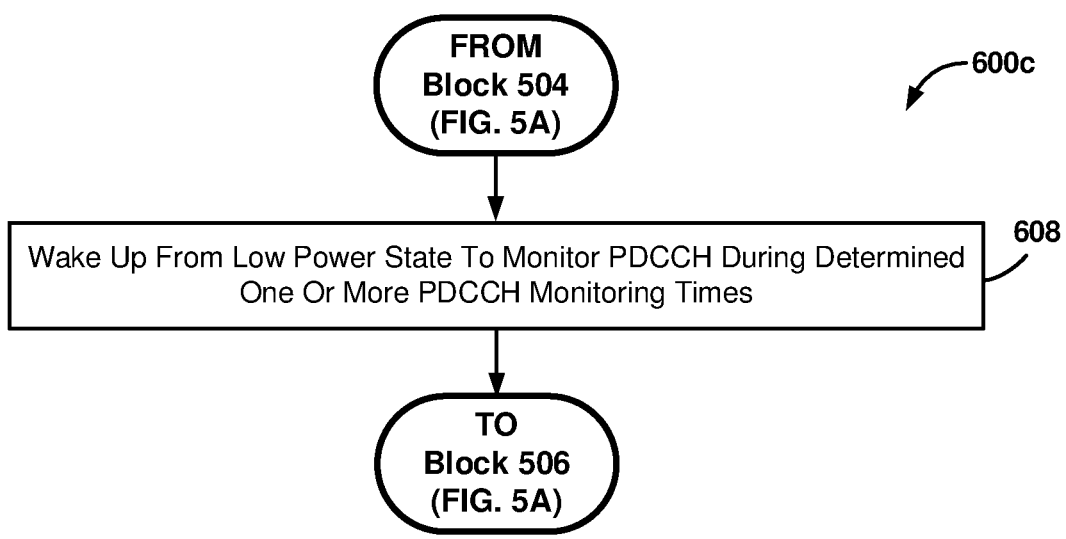

FIG. 6C shows a process flow diagram of example operations that may be performed as part of the method 600c for managing control channel monitoring. With reference to FIGS. 1-6C the operations of the method 600c may be performed by a processor of a mobile device (such as the wireless device 120a-120e, 200, 320).

In some implementations following the operations of block 504 (FIG. 5A), the processor may wakeup from a low power state to monitor the PDCCH during the determined one or more PDCCH monitoring times in block 608.

The processor may proceed to perform the operations of block 506 (FIG. 5A).

Figure 7:
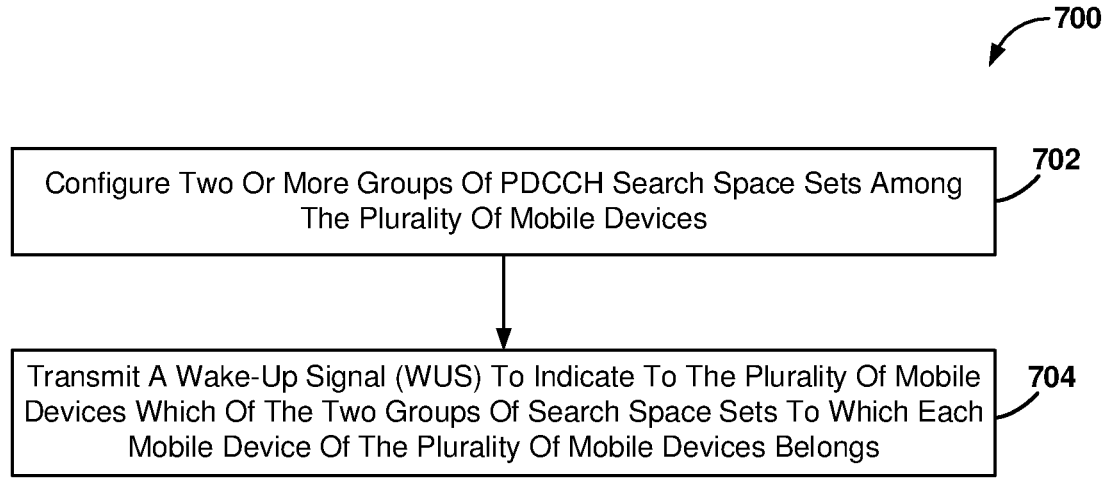
FIG. 7 shows a process flow diagram of an example method performed by a processor of a network element for managing control channel monitoring.

FIG. 7 shows a process flow diagram of an example method 700 performed by a processor of a network element for managing control channel monitoring by a plurality of mobile devices. With reference to FIGS. 1-7 the operations of the method 500 may be performed by a processor of a network element (such as base stations 110a-110d, 350). In some implementations, the network element may include a gNodeB.

In block 702, the processor may configure two or more groups of PDCCH search space sets among the plurality of mobile devices.

In block 704, the processor may transmit a wakeup signal (WUS) to indicate to the plurality of mobile devices which of the two groups of PDCCH search space sets to which each mobile device of the plurality of mobile devices belongs. In some implementations, the wakeup signal may be in a DCI format transmitted over the PDCCH. In some implementations, one of the one or more groups of PDCCH search space sets may be associated with mini-slot level monitoring. In some implementations, one of the one or more groups of PDCCH search space sets may be associated with slot level monitoring. In some implementations, one of the one or more groups of PDCCH search space sets may be associated with a combination of mini-slot level monitoring and slot level monitoring.

Figure 8:
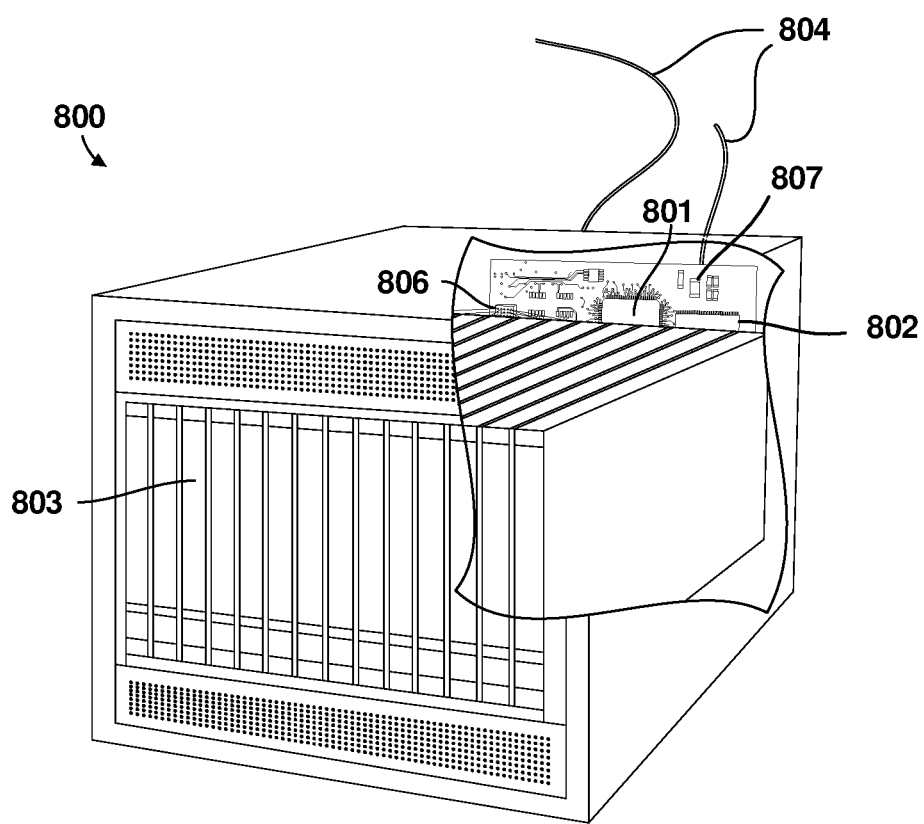
FIG. 8 shows a component block diagram of an example network element.

Some implementations may be implemented on a variety of wireless network devices, an example of which is illustrated in FIG. 8 in the form of a wireless network computing device 800 functioning as a network element of a communication network, such as a base station. Such network computing devices may include at least the components illustrated in FIG. 8. With reference to FIGS. 1-8, the network computing device 800 may typically include a processor 801 coupled to volatile memory 802 and a large capacity nonvolatile memory, such as a disk drive 803. The network computing device 800 also may include a peripheral memory access device such as a floppy disc drive, compact disc (CD) or digital video disc (DVD) drive 806 coupled to the processor 801. The network computing device 800 also may include network access ports 804 (or interfaces) coupled to the processor 801 for establishing data connections with a network, such as the Internet or a local area network coupled to other system computers and servers. The network computing device 800 may include one or more antennas 807 for sending and receiving electromagnetic radiation that may be connected to a wireless communication link. The network computing device 800 may include additional access ports, such as USB, Firewire, Thunderbolt, and the like for coupling to peripherals, external memory, or other devices.

Figure 9:
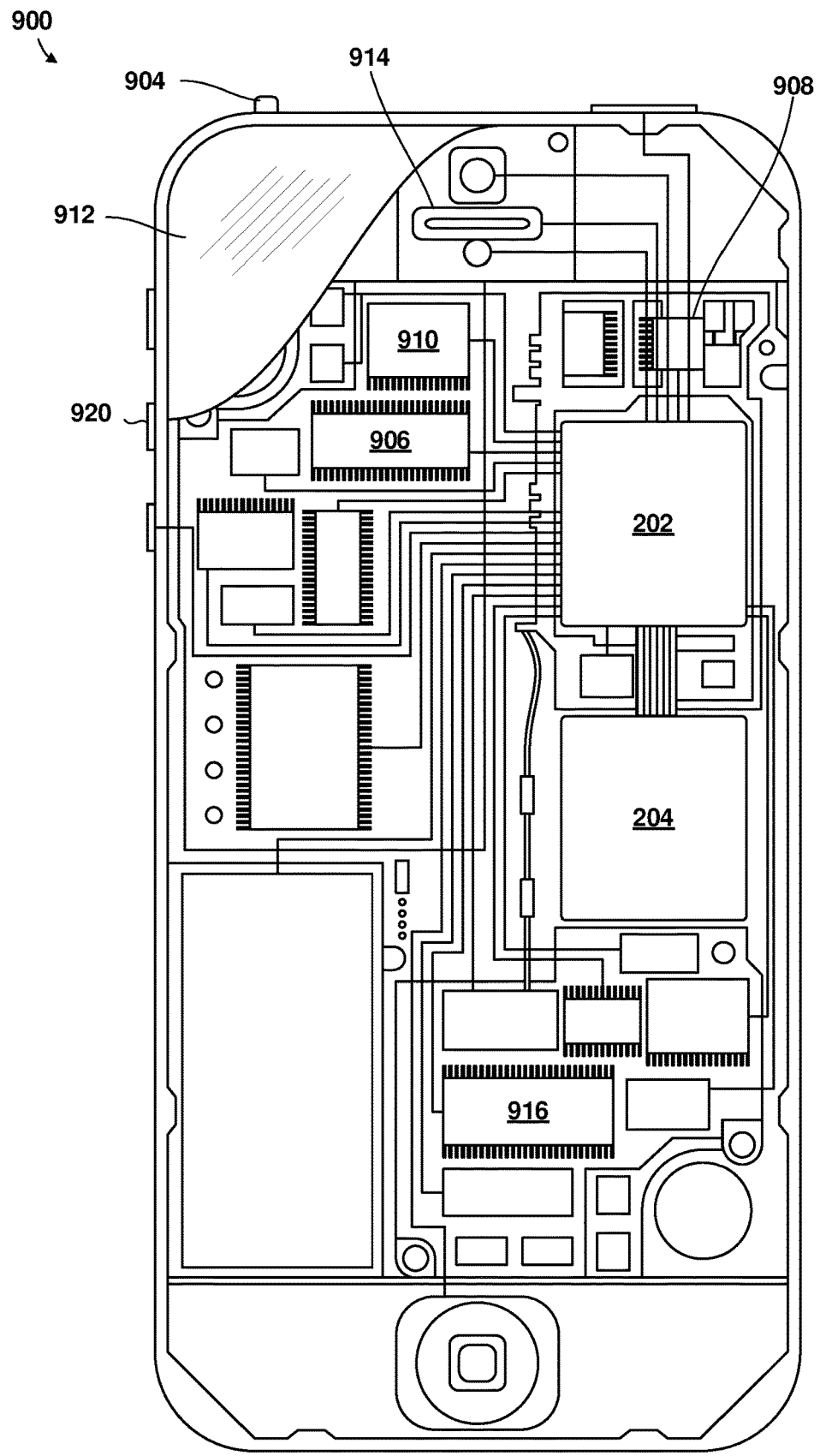
FIG. 9 shows a component block diagram of an example mobile device.

Some implementations may be implemented on a variety of wireless devices (for example, the wireless device 120a-120e, 200, 320), an example of which is illustrated in FIG. 9 in the form of a smartphone 900. The smartphone 900 may include a first SOC 202 (for example, a SOC-CPU) coupled to a second SOC 204 (for example, a 5G capable SOC). The first and second SOCs 202, 204 may be coupled to internal memory 906, 916, a display 912, and to a speaker 914. Additionally, the smartphone 900 may include an antenna 904 for sending and receiving electromagnetic radiation that may be connected to a wireless data link or cellular telephone transceiver 908 coupled to one or more processors in the first or second SOCs 202, 204. Smartphones 900 typically also include menu selection buttons or rocker switches 920 for receiving user inputs.

A typical smartphone 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 908 and CODEC 910 may include a digital signal processor (DSP) circuit (not shown separately).

The processors of the wireless network computing device 800 and the smart phone 900 may be any programmable microprocessor, microcomputer or multiple processor chip or chips that can be configured by software instructions (applications) to perform a variety of functions, including the functions of some implementations described below. In some mobile devices, multiple processors may be provided, such as one processor within an SOC 204 dedicated to wireless communication functions and one processor within an SOC 202 dedicated to running other applications. Typically, software applications may be stored in the memory 906, 916 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various implementations. Such services and standards include, such as third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (such as cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, or content messages. It should be understood that any references to terminology or technical details related to an individual telecommunication standard or technology are for illustrative purposes only, and are not intended to limit the scope of the claims to a particular communication system or technology unless specifically recited in the claim language.

Various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation. For example, one or more of the operations of the methods 500, 600a-600c, and 700 may be substituted for or combined with one or more operations of the methods 500, 600a-600c, and 700.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a non-transitory processor-readable storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available non-transitory storage media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

In one or more aspects, the functions described may be implemented by a processor, which may be coupled to a memory. The memory may be a non-transitory computer-readable storage medium that stores processor-executable instructions. The memory may store an operating system, user application software, or other executable instructions. The memory also may store application data, such as an array data structure. The processor may read and write information to and from the memory. The memory also may store instructions associated with one or more protocol stacks. A protocol stack generally includes computer executable instructions to enable communication using a radio access protocol or communication protocol.

Various modifications to the implementations described in this disclosure may be readily apparent to those skilled in the art, and the generic principles defined herein may be applied to other implementations without departing from the scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of managing control channel monitoring performed by one or more processors of a mobile device, comprising:
   receiving a wakeup signal comprising an indication of one or more groups of physical downlink control channel (PDCCH) search space sets;
   identifying one or more PDCCH monitoring times based on the indication of the one or more groups of PDCCH search space sets, wherein the indication indicates that the one or more groups of PDCCH search space sets are associated with a combination of mini-slot level monitoring and slot level monitoring; and
   monitoring a PDCCH during the one or more PDCCH monitoring times.

2. The method of claim 1, wherein receiving the wakeup signal comprising the indication of the one or more groups of PDCCH search space sets comprises:
   identifying a value of a bit in the wakeup signal; and
   determining the one or more groups of PDCCH search space sets based on the value of the bit in the wakeup signal.

3. The method of claim 1, wherein receiving the wakeup signal comprising the indication of the one or more groups of PDCCH search space sets comprises identifying two groups of PDCCH search space sets between which the mobile device may switch to monitor the PDCCH.

4. The method of claim 1, wherein the one or more groups of PDCCH search space sets indicate frequencies in a New Radio Unlicensed (NR-U) spectrum.

5. The method of claim 1, wherein monitoring the PDCCH during the one or more PDCCH monitoring times comprises waking up from a low power state to monitor the PDCCH during the one or more PDCCH monitoring times.

6. A method performed by a network element for managing control channel monitoring, comprising:
   configuring two or more groups of physical downlink control channel (PDCCH) search space sets among a plurality of mobile devices; and
   transmitting a wakeup signal (WUS) to indicate to the plurality of mobile devices which of the two or more groups of PDCCH search space sets to which each mobile device of the plurality of mobile devices belongs, wherein the WUS indicates that the two or more groups of PDCCH search space sets are associated with a combination of mini-slot level monitoring and slot level monitoring.

7. The method of claim 6, wherein the WUS is in a DCI format transmitted over a PDCCH.

8. The method of claim 6, wherein the network element is a gNodeB.

9. An apparatus for wireless communication at a mobile device, comprising:
   one or more memories storing processor-executable code; and
   one or more processors coupled with the one or more memories, the one or more processors configured to cause the apparatus to:
   receive a wakeup signal comprising an indication of one or more groups of physical downlink control channel (PDCCH) search space sets;
   identify one or more PDCCH monitoring times based on the indication of the one or more groups of PDCCH search space sets, wherein the indication indicates that the one or more groups of PDCCH search space sets are associated with a combination of mini-slot level monitoring and slot level monitoring; and
   monitor a PDCCH during the one or more PDCCH monitoring times.

10. The apparatus of claim 9, wherein the one or more processors, to receive the wakeup signal comprising the indication of the one or more groups of PDCCH search space sets, are configured to cause the apparatus to:
    identify a value of a bit in the wakeup signal; and
    determine the one or more groups of PDCCH search space sets based on the value of the bit in the wakeup signal.

11. The apparatus of claim 9, wherein the one or more processors, to receive the wakeup signal comprising the indication of the one or more groups of PDCCH search space sets, are configured to cause the apparatus to identify two groups of PDCCH search space sets between which the mobile device may switch to monitor the PDCCH.

12. The apparatus of claim 9, wherein the one or more groups of PDCCH search space sets indicate frequencies in a New Radio Unlicensed (NR-U) spectrum.

13. The apparatus of claim 9, wherein the one or more processors, to monitor the PDCCH during the one or more PDCCH monitoring times, are configured to cause the apparatus to wake up from a low power state to monitor the PDCCH during the one or more PDCCH monitoring times.

14. An apparatus for wireless communication at a network element, comprising:
    one or more memories storing processor-executable code; and
    one or more processors coupled with the one or more memories, the one or more processors configured to cause the apparatus to:
    configure two or more groups of physical downlink control channel (PDCCH) search space sets among a plurality of mobile devices; and
    transmit a wakeup signal (WUS) to indicate to the plurality of mobile devices which of the two or more groups of PDCCH search space sets to which each mobile device of the plurality of mobile devices belongs, wherein the WUS indicates that the two or more groups of PDCCH search space sets are associated with a combination of mini-slot level monitoring and slot level monitoring.

15. The apparatus of claim 14, wherein the WUS is in a DCI format transmitted over a PDCCH.

16. The apparatus of claim 14, wherein the network element is a gNodeB.

17. A non-transitory processor-readable storage medium having stored thereon processor-executable instructions configured to cause one or more processors of an apparatus for wireless communication at a mobile device to perform operations comprising:
receiving a wakeup signal comprising an indication of one or more groups of physical downlink control channel (PDCCH) search space sets;
identifying one or more PDCCH monitoring times based on the indication of the one or more groups of PDCCH search space sets, wherein the indication indicates that the one or more groups of PDCCH search space sets are associated with a combination of mini-slot level monitoring and slot level monitoring; and
monitoring a PDCCH during the one or more PDCCH monitoring times.

18. The non-transitory processor-readable storage medium of claim 17, wherein the stored processor-executable instructions are configured to cause the at least one or more processors to perform operations comprising:
identifying a value of a bit in the wakeup signal; and
determining the one or more groups of PDCCH search space sets based on the value of the bit in the wakeup signal.

19. The non-transitory processor-readable storage medium of claim 17, wherein the stored processor-executable instructions are configured to cause the at least one or more processors to perform operations comprising identifying two groups of PDCCH search space sets between which the mobile device may switch to monitor the PDCCH.

20. The non-transitory processor-readable storage medium of claim 17, wherein the one or more groups of PDCCH search space sets indicate frequencies in a New Radio Unlicensed (NR-U) spectrum.

21. The non-transitory processor-readable storage medium of claim 17, wherein the stored processor-executable instructions are configured to cause the one or more processors to perform operations comprising waking up from a low power state to monitor the PDCCH during the one or more PDCCH monitoring times.

22. A non-transitory processor-readable storage medium having stored thereon processor-executable instructions configured to cause one or more processors of an apparatus for wireless communication at a network element to perform operations comprising:
configuring two or more groups of physical downlink control channel (PDCCH) search space sets among a plurality of mobile devices; and
transmitting a wakeup signal (WUS) to indicate to the plurality of mobile devices which of the two or more groups of PDCCH search space sets to which each mobile device of the plurality of mobile devices belongs, wherein the WUS indicates that the two or more groups of PDCCH search space sets are associated with a combination of mini-slot level monitoring and slot level monitoring.

23. The non-transitory processor-readable storage medium of claim 22, wherein the WUS is in a DCI format transmitted over a PDCCH.

24. The non-transitory processor-readable storage medium of claim 22, wherein the network element is a gNodeB.

25. An apparatus for wireless communication at a mobile device, comprising:
means for receiving a wakeup signal comprising an indication of one or more groups of physical downlink control channel (PDCCH) search space sets;
means for identifying one or more PDCCH monitoring times based on the indication of the one or more groups of PDCCH search space sets, wherein the indication indicates that the one or more groups of PDCCH search space sets are associated with a combination of mini-slot level monitoring and slot level monitoring; and
means for monitoring a PDCCH during the one or more PDCCH monitoring times.

26. The apparatus of claim 25, further comprising:
means for identifying a value of a bit in the wakeup signal; and
means for determining the one or more groups of PDCCH search space sets based on the value of the bit in the wakeup signal.

27. The apparatus of claim 25, further comprising means for identifying two groups of PDCCH search space sets between which the mobile device may switch to monitor the PDCCH.

28. The apparatus of claim 25, wherein the one or more groups of PDCCH search space sets indicate frequencies in a New Radio Unlicensed (NR-U) spectrum.

29. The apparatus of claim 25, wherein further comprising means for waking up from a low power state to monitor the PDCCH during the one or more PDCCH monitoring times.

30. An apparatus for wireless communication at a network element, comprising:
means for configuring two or more groups of physical downlink control channel (PDCCH) search space sets among a plurality of mobile devices; and
means for transmitting a wakeup signal (WUS) to indicate to the plurality of mobile devices which of the two or more groups of PDCCH search space sets to which each mobile device of the plurality of mobile devices belongs, wherein the WUS indicates that the two or more groups of PDCCH search space sets are associated with a combination of mini-slot level monitoring and slot level monitoring.

31. The apparatus of claim 30, wherein the WUS is in a DCI format transmitted over a PDCCH.

32. The apparatus of claim 30, wherein the network element is a gNodeB.

* * * * *